US008694305B1

(12) United States Patent
Grove et al.

(10) Patent No.: US 8,694,305 B1
(45) Date of Patent: Apr. 8, 2014

(54) NATURAL LANGUAGE PROCESSING (NLP) PORTAL FOR THIRD PARTY APPLICATIONS

(71) Applicant: Ask Ziggy, Inc., Rocklin, CA (US)

(72) Inventors: Kyle Wade Grove, Roseville, CA (US); Shai Leib, Rocklin, CA (US); Thomas Bertran, Sacramento, CA (US); Dipesh Gandhi, Rancho Cordova, CA (US)

(73) Assignee: Ask Ziggy, Inc., Rocklin, CA (US)

( * ) Notice: Subject to any disclaimer, the term of this patent is extended or adjusted under 35 U.S.C. 154(b) by 0 days.

(21) Appl. No.: 13/971,143

(22) Filed: Aug. 20, 2013

Related U.S. Application Data

(60) Provisional application No. 61/787,361, filed on Mar. 15, 2013.

(51) Int. Cl.
*G06F 17/20* (2006.01)
*G06F 17/28* (2006.01)

(52) U.S. Cl.
USPC .......................... 704/9; 704/1; 704/2; 704/4

(58) Field of Classification Search
USPC ................................................. 704/1, 2, 4, 9
See application file for complete search history.

(56) References Cited

U.S. PATENT DOCUMENTS

| | | | |
|---|---|---|---|
| 5,386,556 A * | 1/1995 | Hedin et al. ........................... | 1/1 |
| 6,317,486 B1 * | 11/2001 | Hollins et al. ............. | 379/88.23 |
| 6,466,654 B1 | 10/2002 | Cooper et al. | |
| 7,266,496 B2 | 9/2007 | Wang et al. | |
| 7,707,032 B2 | 4/2010 | Wang et al. | |
| 2004/0066416 A1 * | 4/2004 | Knott et al. ..................... | 345/797 |
| 2005/0149318 A1 * | 7/2005 | Honda et al. ....................... | 704/9 |
| 2006/0259865 A1 * | 11/2006 | Knott et al. ..................... | 715/741 |
| 2008/0208583 A1 * | 8/2008 | Jan et al. ........................ | 704/257 |
| 2009/0144609 A1 * | 6/2009 | Liang et al. ..................... | 715/230 |
| 2010/0280403 A1 * | 11/2010 | Erdogmus et al. ............. | 600/545 |
| 2010/0299142 A1 * | 11/2010 | Freeman et al. ................... | 704/9 |
| 2011/0231182 A1 * | 9/2011 | Weider et al. ...................... | 704/9 |
| 2012/0203539 A1 * | 8/2012 | Axelrod et al. .................... | 704/2 |
| 2012/0253783 A1 * | 10/2012 | Castelli et al. .................... | 704/3 |
| 2013/0030792 A1 * | 1/2013 | Zhao et al. ........................ | 704/9 |

OTHER PUBLICATIONS

Buyko et al. "Automatically Adapting an NLP Core Engine to the Biology Domain", Proceedings of the Joint BioLINK-Bio-Ontologies Meeting. A Joint Meeting of the ISMB Special Interest Group on Bio-Ontologies and the BioLINK Special Interest Group on Text Data Mining in Association with ISMB. 2006.*

Carreras et al. "FreeLing: An Open-Source Suite of Language Analyzers", LREC, 2004.*

(Continued)

*Primary Examiner* — Jialong He
(74) *Attorney, Agent, or Firm* — Osha Liang LLP

(57) ABSTRACT

A method for generating an natural language processing (NLP) model including obtaining tags, obtaining actions to be implemented by a third party application, obtaining a training corpus including sentences, where at least one word in each of the sentences is associated with one of the tags, and wherein each of the sentences is associated with one of the actions. The method further includes generating features for the NLP model for the third party application using the tags, the actions, and the training corpus, training the NLP model using the features and the training corpus to obtain a trained NLP model, and generating an APIKey for use by the third party application, where the API provides the third party application access to the trained NLP model.

21 Claims, 15 Drawing Sheets

(56) References Cited

OTHER PUBLICATIONS

Harbusch, K., Woch, J. "Integrated Natural Language Generation with Schema-Tree Adjoining Grammars" University of Koblenz-Landau, Computer Science Department. 2002 (31 pages).

Turian, J. et al., "Word Representations: A Simple and General Method for Semi-Supervised Learning", In Proceedings of the 48th Annual Meeting of the Association for Computational Linguistics (Jul. 2010), pp. 384-394 Key: citeulike: 9336123.

Cutting, D., et al. "A Practical Part-of-Speech Tagger. Proceedings of the Third Conference on Applied Natural Language Processing" 1992 pp. 133-140.

Rabiner, L., "A Tutorial on Hidden Markov Models and Selected Applications in Speech Recognition" Proceedings of the IEEE, vol. 77, No. 2 Feb. 1989 pp. 257-286.

Merialdo, B., "Tagging English Text with a Probabilistic Model" Association for Computational Linguistics 20(2). 1994 pp. 155-171.

Uschold, M. et al. "Ontologies: Principles, Methods and Applications" to appear in Knowledge Engineering Review vol. 11 No. 2, Jun. 1996, (69 pages).

Berger, A. et al "A Maximum Entropy Approach to Natural Language Processing", Computational Linguistics 22(1). 1996 pp. 39-71.

Marques, L. "Semantic Role Labeling as Sequential Tagging", CONLL '05 Proceeding of the Ninth Conference on Computational Natural Language Learning. 2005 pp. 193-196.

\* cited by examiner

FIG. 9A

Ask Ziggy API Admin

DOCTOR ON CALL | Application Details | ① Entity List

Entity Lists

| Name | Type | | |
|---|---|---|---|
| Asthma | File | Edit | Delete |
| HeartDisease | File | Edit | Delete |
| Diabetes | File | Edit | Delete |
| Eczema | File | Edit | Delete |

[Add New List]

Ask Ziggy API Admin

🗂 Manage Applications

| DOCTOR ON CALL | 🏠 Application Details | ① Entity List | ② Sample | 👤 ⊕ NLP Training ▼ | 🧪 Test ▼ |

Test Console

Input:

[ I have trouble sleeping and having some allergies ]

[Submit]

*Will use current NLP Model Trained on Fri Feb 15 2013 11:50:32

---

INPUT: I have trouble sleeping and having some allergies

Output                                    Raw JSON

[ACTION] DIAGNOSIS                        {
         trouble sleeping, allergies       "ACTION":"DIAGNOSIS",
                                           "ASTHMA":"trouble sleeping, allergies"
URL                                       } http://localhost/NLP_API/api/az/parse?input=I+have+trouble+sleeping+and+having+some+allergies+&timestamp=2013-02-
27+19%3a46%3a23Z&apikey=4779c721&usend=PortalTestConsole&signature=B6IGymyTQWM8c%26x0KTBDnpk2bXqO1%2fq10aYoPBf5uQ53d

NATURAL LANGUAGE PROCESSING (NLP) PORTAL FOR THIRD PARTY APPLICATIONS

CROSS-REFERENCE TO RELATED APPLICATIONS

This application claims benefit under 35 U.S.C. §119(e) to U.S. Provisional Application Ser. No. 61/787,361 filed on Mar. 15, 2013. U.S. Provisional Application Ser. No. 61/787,361 is incorporated by reference in its entirety.

BACKGROUND

Traditionally, when developers wanted to include natural language processing (NLP) in an application, the developers would need to create their own NLP engine (that includes an NLP model) specific to the application domain. This is a time consuming and highly technical task that usually results in greatly increasing the time required to create and deploy the application.

SUMMARY

In general, in one aspect, the invention relates to a non-transitory computer readable medium comprising instructions, which when executed perform a method for generating a natural language processing (NLP) model, the method comprising: obtaining a plurality of tags, obtaining a plurality of actions to be implemented by a third party application, obtaining a training corpus comprising a plurality of sentences, wherein at least one word in each of the plurality of sentences is associated with one of the plurality of tags, and wherein each of the plurality of sentences is associated with one of the plurality of actions, generating a plurality of features for the NLP model for the third party application using the plurality of tags, the plurality of actions, and the training corpus, training the NLP model using the plurality of features and the training corpus to obtain a trained NLP model, and generating an APIKey for use by the third party application, wherein the API provides the third party application access to the trained NLP model.

Other aspects of the invention will be apparent from the following description and the appended claims.

BRIEF DESCRIPTION OF DRAWINGS

FIGS. 9A-9F show an example in accordance with one or more embodiments of the invention.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-9F, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to a NLP system that enables third parties to create custom NLP models and then use these custom NLP models with a NLP engine to provide NLP functionality to their applications. Further, embodiments of the invention enable the third parties to access the aforementioned NLP functionality using APIKeys that are unique to the NLP models created by the third parties.

Figure 1:
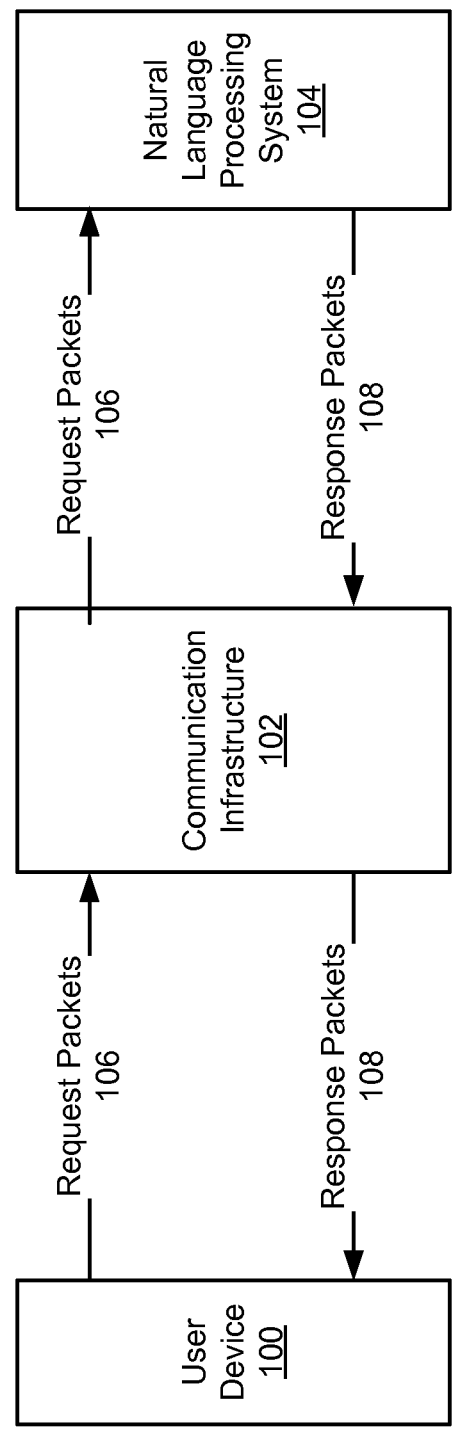
FIG. 1 shows a system in accordance with one or more embodiments of the invention.

FIG. 1 shows a system in accordance with one or more embodiments of the invention. The system includes one or more user devices (100) configured to send request packets (106) to the natural language processing (NLP) system (104) via a communication infrastructure (102). The NLP system (104) is configured to receive request packets, process the request packets to generate response packets (108) (see FIG. 8), and to send the response packets (108) to the user device (100).

In one embodiment of the invention, the user device (100) corresponds to any physical device that includes functionality to transmit request packets to the NLP system (104) using an APIKey (see FIG. 8) and receive response packets (108) from the NLP system. The user device (100) may further include functionality to execute one or more applications (not shown). The applications may be user-level applications and/or kernel-level applications. The applications are configured to generate request packets, where request packets issued by the applications are received and processed by the NLP system (104). The applications may further be configured to receive and process the response packets. In some embodiments of the invention, the request packets may be generated by dedicated hardware and/or the response packets may be processed by dedicated hardware (as discussed below).

In one embodiment of the invention, the physical device may be implemented on a general purpose computing device (i.e., a device with a processor(s), memory, and an operating system) such as, but not limited to, a desktop computer, a laptop computer, a gaming console, and a mobile device (e.g., a mobile phone, a smart phone, a personal digital assistant, a gaming device, a wearable computing device, etc.).

Alternatively, the physical device may be a special purpose computing device that includes an application-specific processor(s)/hardware configured to only execute embodiments of the invention. In such cases, the physical device may implement embodiments of the invention in hardware as a family of circuits and have limited functionality to receive input and generate output in accordance with various embodiments of the invention. In addition, such computing devices may use a state-machine to implement various embodiments of the invention.

In another embodiment of the invention, the physical device may correspond to a computing device that includes a general purpose processor(s) and an application-specific processor(s)/hardware. In such cases, one or more portions of the invention may be implemented using the operating system and general purpose processor(s), and one or more portions of the invention may be implemented using the application-specific processor(s)/hardware.

In one embodiment of the invention, the communication infrastructure (102) corresponds to any wired network, wireless network, or combined wired and wireless network over which the user device (100) and the NLP system (104) communicate. In one embodiment of the invention, the user device (100) and NLP system (104) may communicate using any known communication protocols.

In one embodiment of the invention, the NLP system (104) corresponds to any physical device(s) configured to process the request packets in accordance with the methods shown in FIGS. 4-8.

In one embodiment of the invention, the request packets may include (i) digital audio data and/or (ii) text corresponding to a transcription of an audio signal (regardless of the type of audio signal). In one or more embodiments of the invention, there may be no audio signal; rather text may be obtained via the user device and provided to the NLP system. The text may be generated by a user or, alternatively, may be computer generated.

In one embodiment of the invention, request packets are generated by encoding an audio signal in a digital form and then converting the resulting digital audio data into one or more request packets. The conversion of the digital audio data into one or more request packets may include applying an audio codec to the digital audio data to compress the digital audio data prior to generating the request packets. The use of the audio codec may enable a smaller number of request packets to be sent to the NLP system.

In one embodiment of the invention, the audio signal may be obtained from a user speaking into a microphone on the user device. Alternatively, the audio signal may correspond to a pre-recorded audio signal that the user provided to the user device using conventional methods. In other embodiments of the invention, the user device may receive the digital audio data directly instead of receiving an analog audio signal. In other embodiments of the invention, the audio signal may be computer generated.

In one embodiment of the invention, the audio signal includes one or more audio utterances. An audio utterance corresponds to a unit of speech bounded by silence. The utterance may be a word, a clause, a sentence, or multiple sentences. A text utterance corresponds to a unit of speech (in text form) that is provided by a user or system, where the unit of speech may be a word, a clause, a sentence, or multiple sentences. Embodiments of the invention apply to both types of utterances. Further, unless otherwise specified, "utterance" means either an audio utterance, a text utterance, or a combination thereof.

While FIG. 1 shows a system that includes a single user device, communication infrastructure, and NLP system, embodiments of the invention may include multiple user devices, communication infrastructures, and NLP systems without departing from the invention. Further, the invention is not limited to the system configuration shown in FIG. 1.

Figure 2:
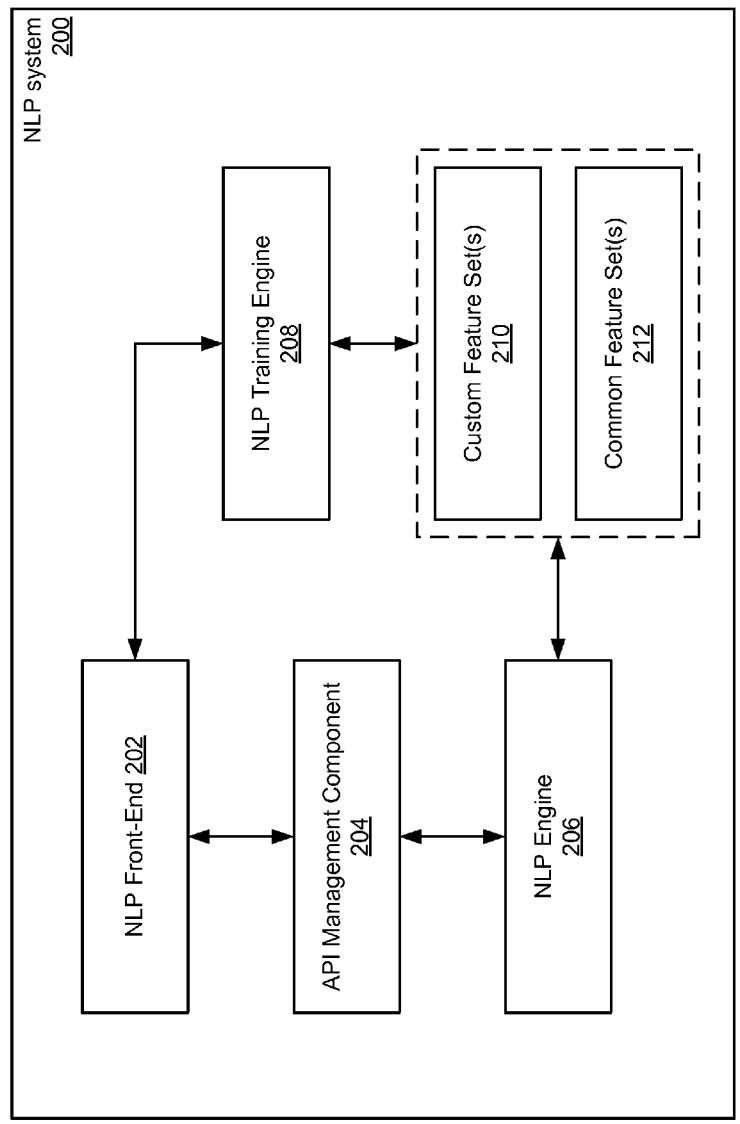
FIG. 2 shows a natural language processing (NLP) system in accordance with one or more embodiments of the invention.

FIG. 2 shows a natural language processing (NLP) system in accordance with one or more embodiments of the invention. The NLP system (200) includes an NLP front-end (202), an API management component (204), a NLP training engine (208), an NLP engine (206), a custom feature set(s) (210), and a common feature set(s) (212). Each of these components is described below.

Figure 6A:
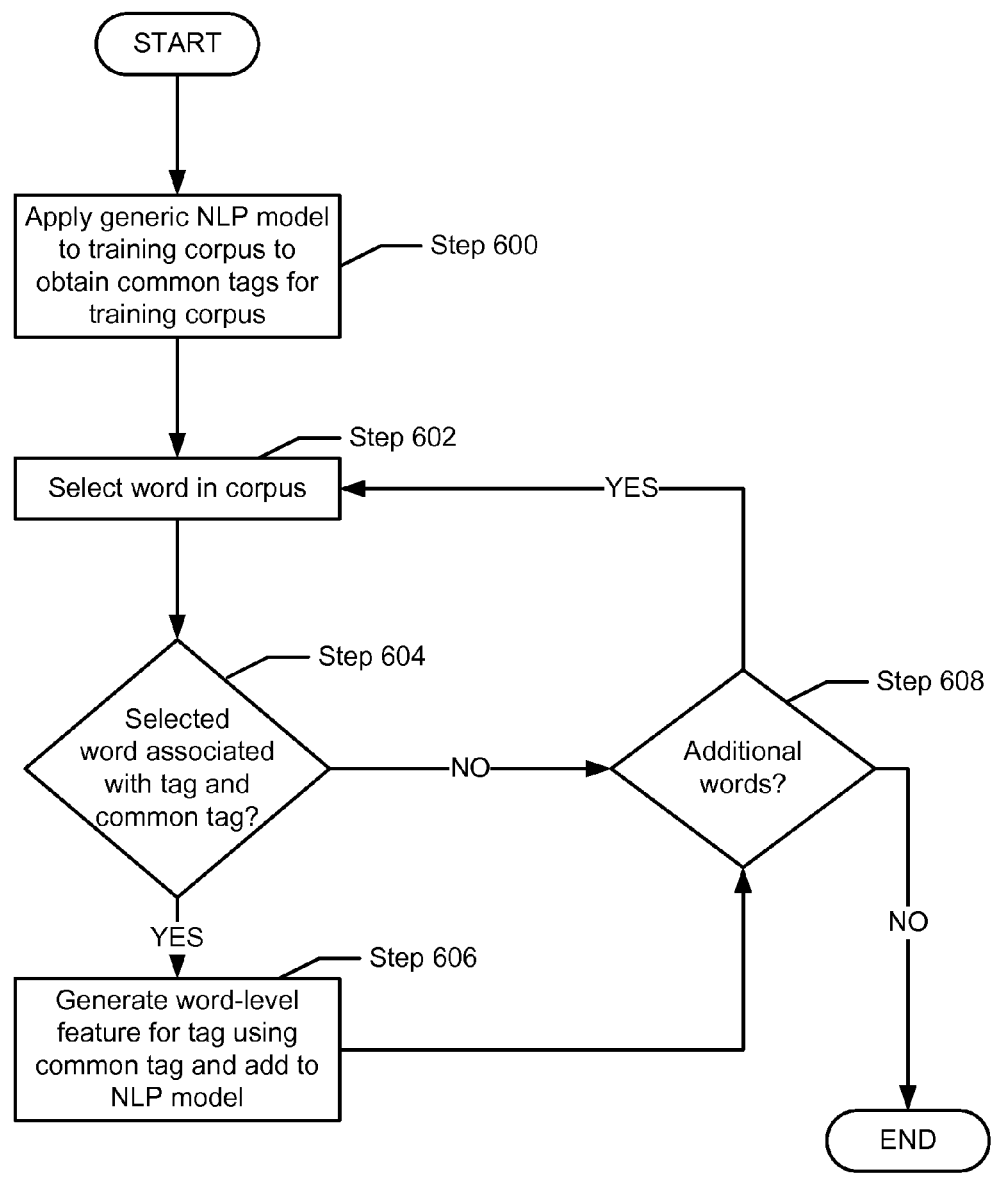
FIGS. 6A-6B show flowcharts for generating features for a NLP model using model conjunction in accordance with one or more embodiments of the invention.
Figure 6B:
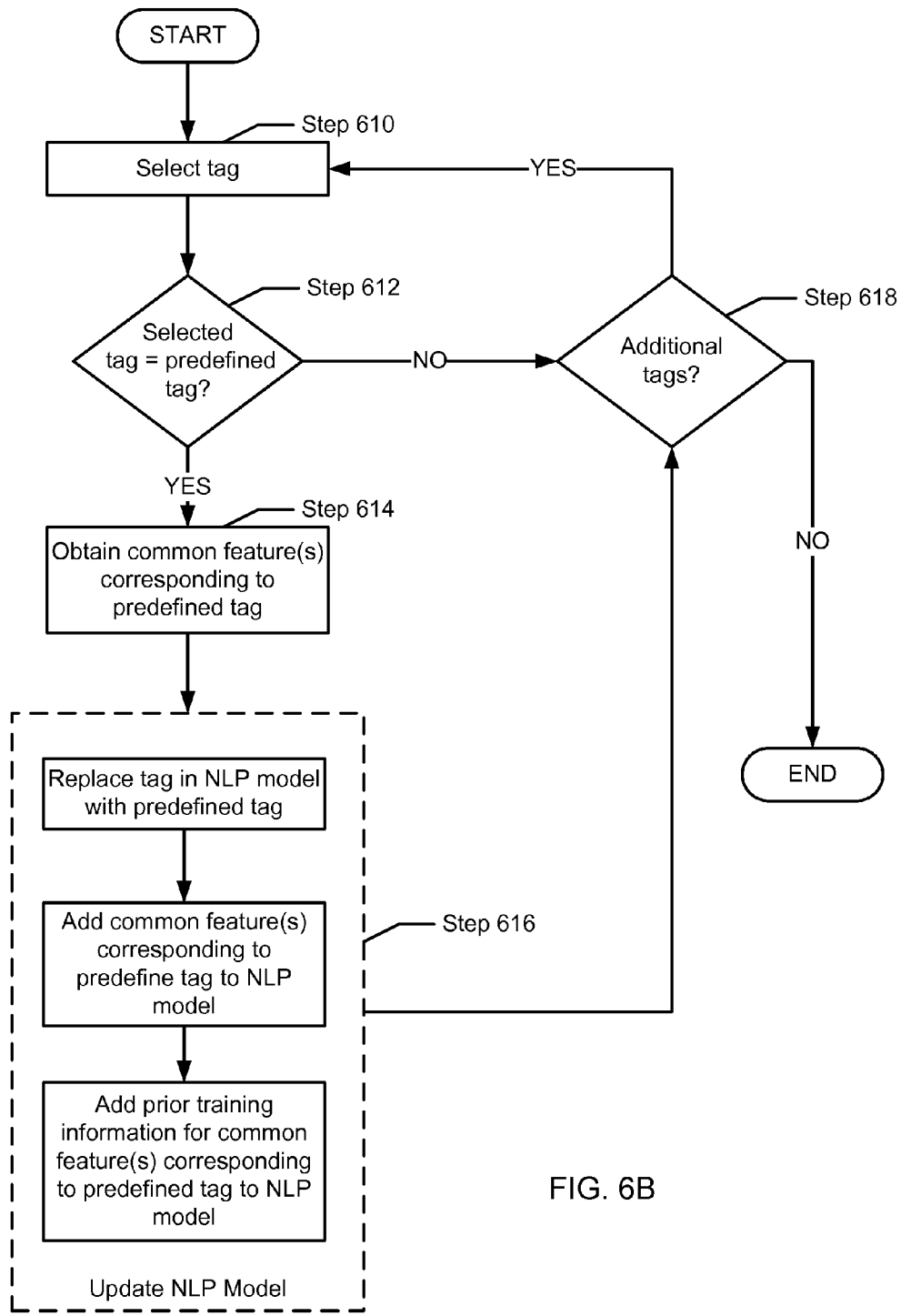
Figure 7:
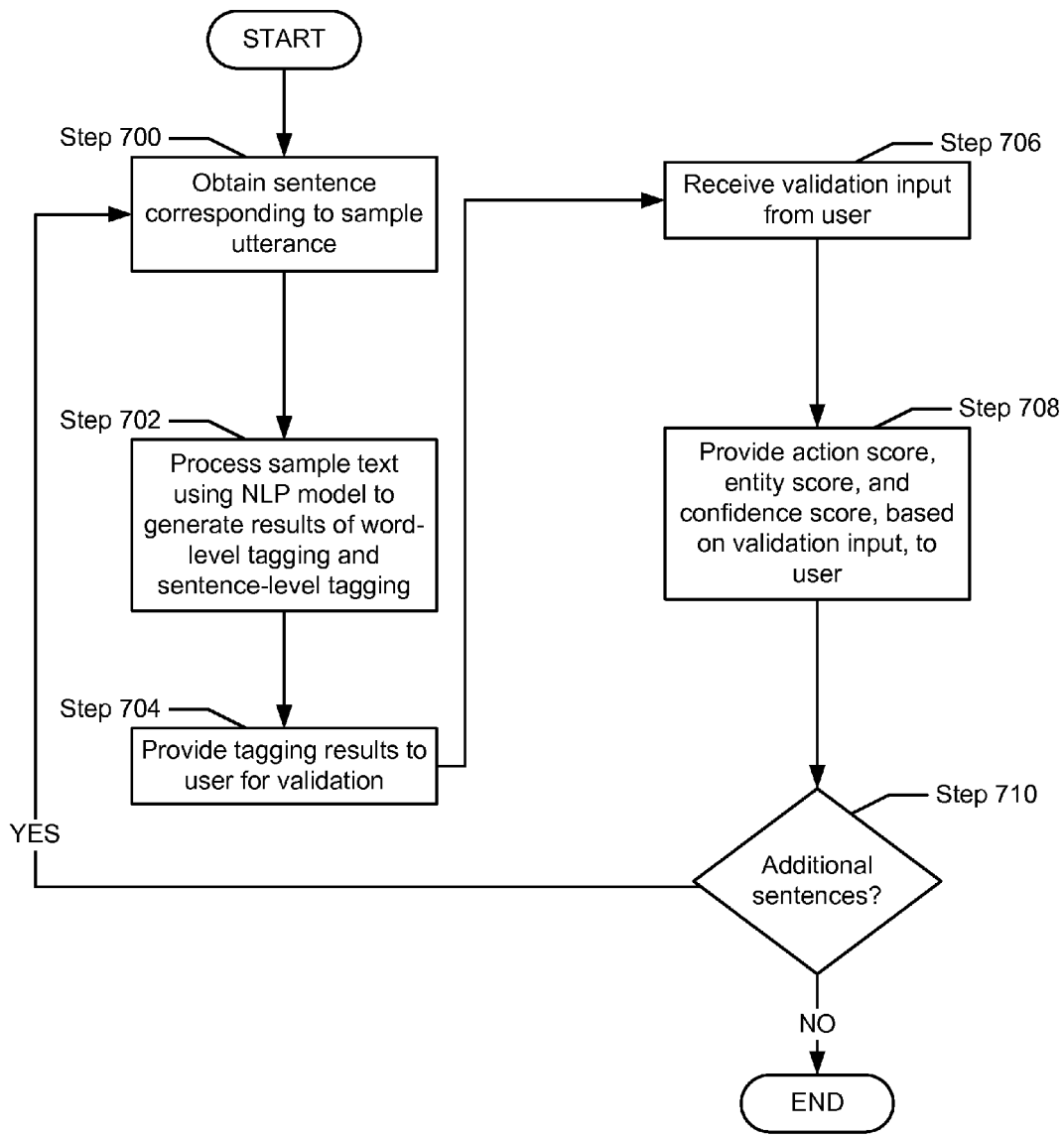
FIG. 7 shows a flowchart for validating the NLP model in accordance with one or more embodiments of the invention.
Figure 8:
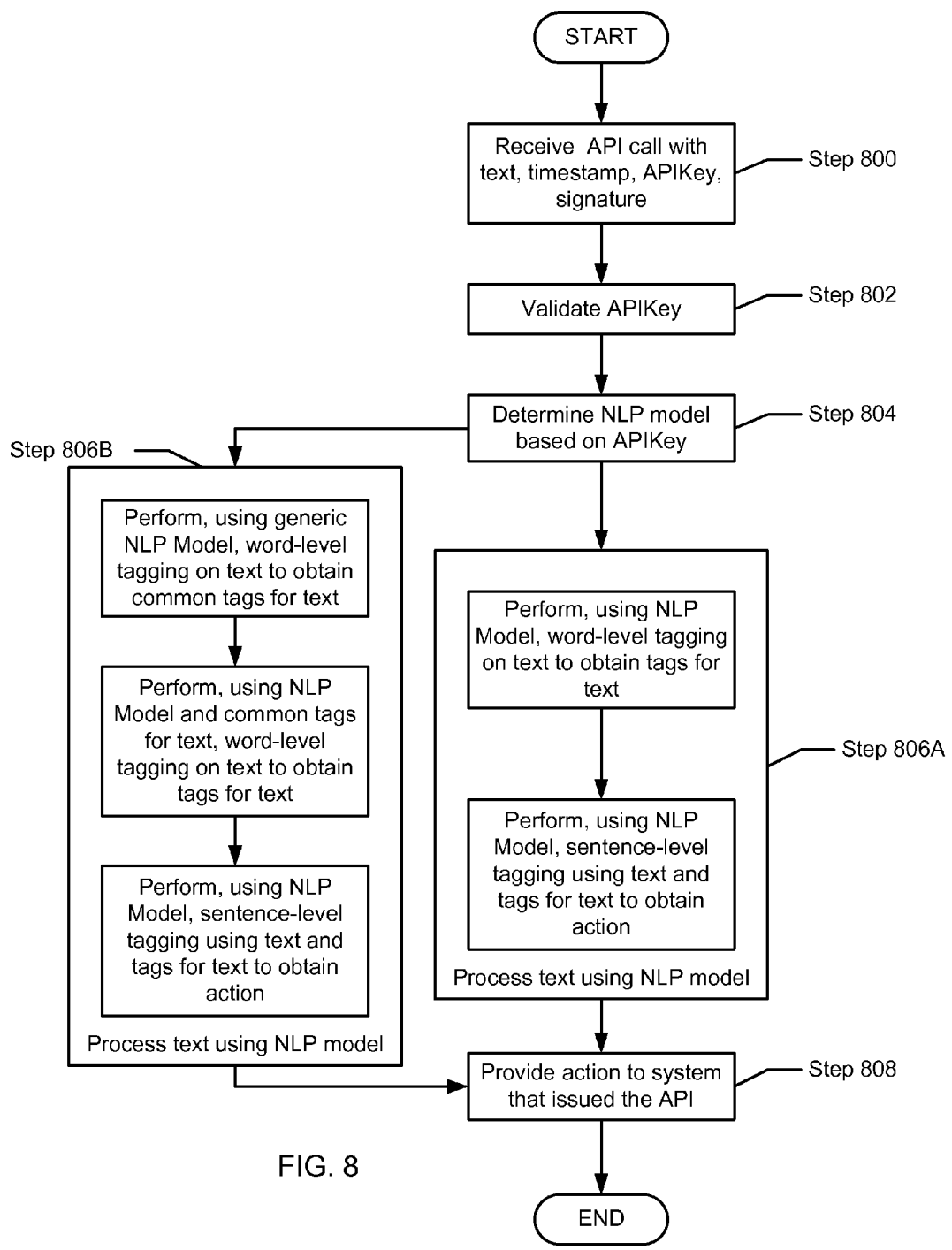
FIG. 8 shows a flowchart for using an API for a NLP model in accordance with one or more embodiments of the invention.

The NLP system includes functionality to (i) generate NLP models for third parties in accordance with FIGS. 4-7 and (ii) to service API calls in accordance with FIG. 8.

In one embodiment of the invention, the NLP front-end (202) includes functionality to interface with the user devices (100) and other components in the NLP system (200). Further, when a user is generating NLP Models as described in FIGS. 4-7, the NLP front-end may also include functionality to act as a web-server configured to serve web pages to the user device and to receive input from the user device via the user's web browser and/or a standalone application on the user device. (See e.g., FIGS. 9A-9F) In one embodiment of the invention, if the user is executing a web browser to interface with the NLP front-end, then the NLP front-end includes the web pages to send to user devices(s). Upon receipt of input from the user device (the form of which may vary based on how the NLP system is implemented), the NLP front-end is configured to extract and, if necessary, modify the input, prior to sending the input to the other components in the NLP system. Similarly, upon receipt of input from other components in the NLP system, the NLP front-end is configured to perform the required formatting of such input, prior to sending the formatted input to the user device(s). In one embodiment of the invention, the NLP front-end may interact with multiple user devices simultaneously.

Those skilled in the art will appreciate that the user device (s) used to interact with the NLP system in order to generate the NLP model may be different than the user device(s) that issues the API calls.

Figure 4:
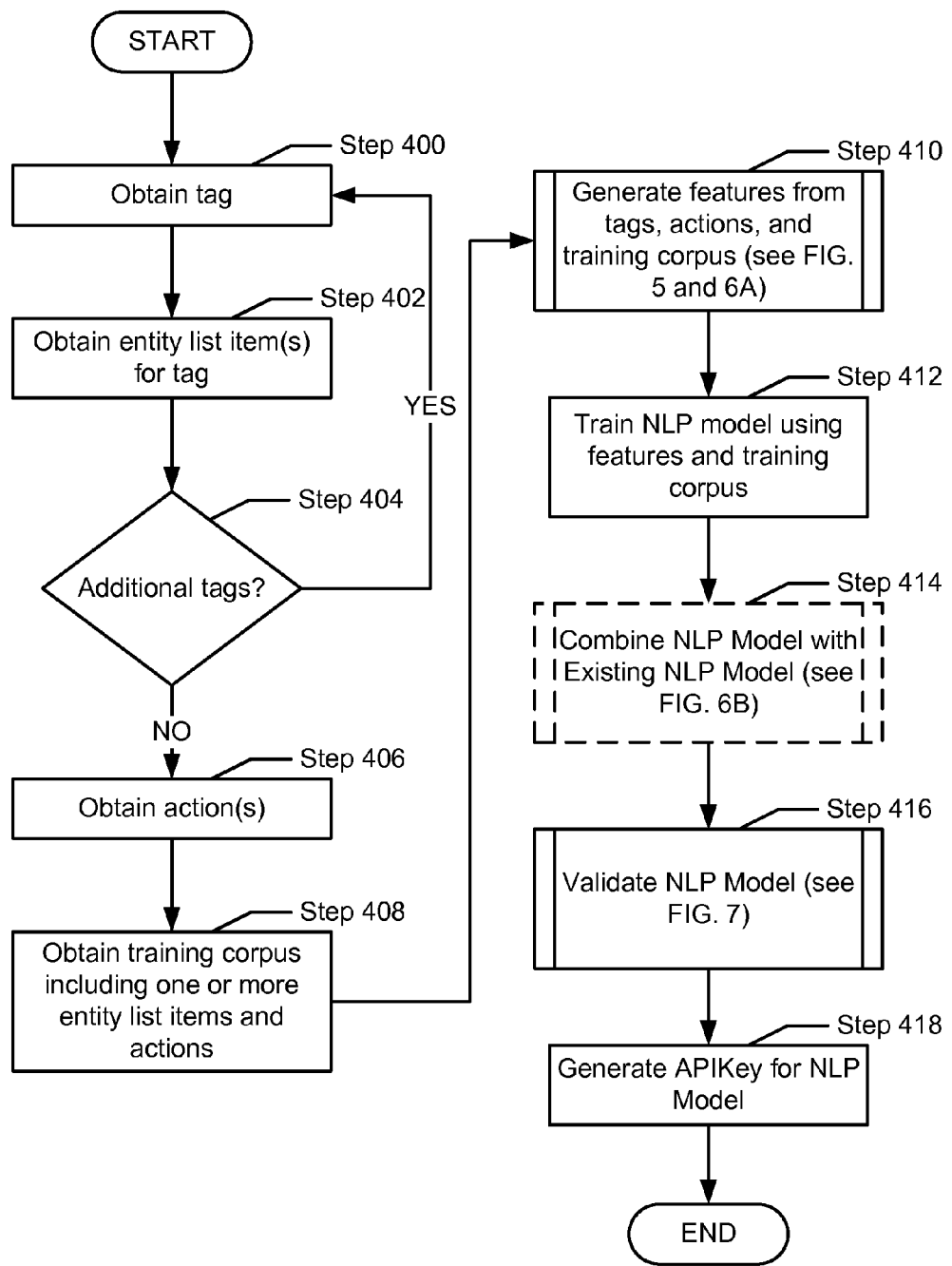
FIG. 4 shows a flowchart for generating an NLP model in accordance with one or more embodiments of the invention.
Figure 5:
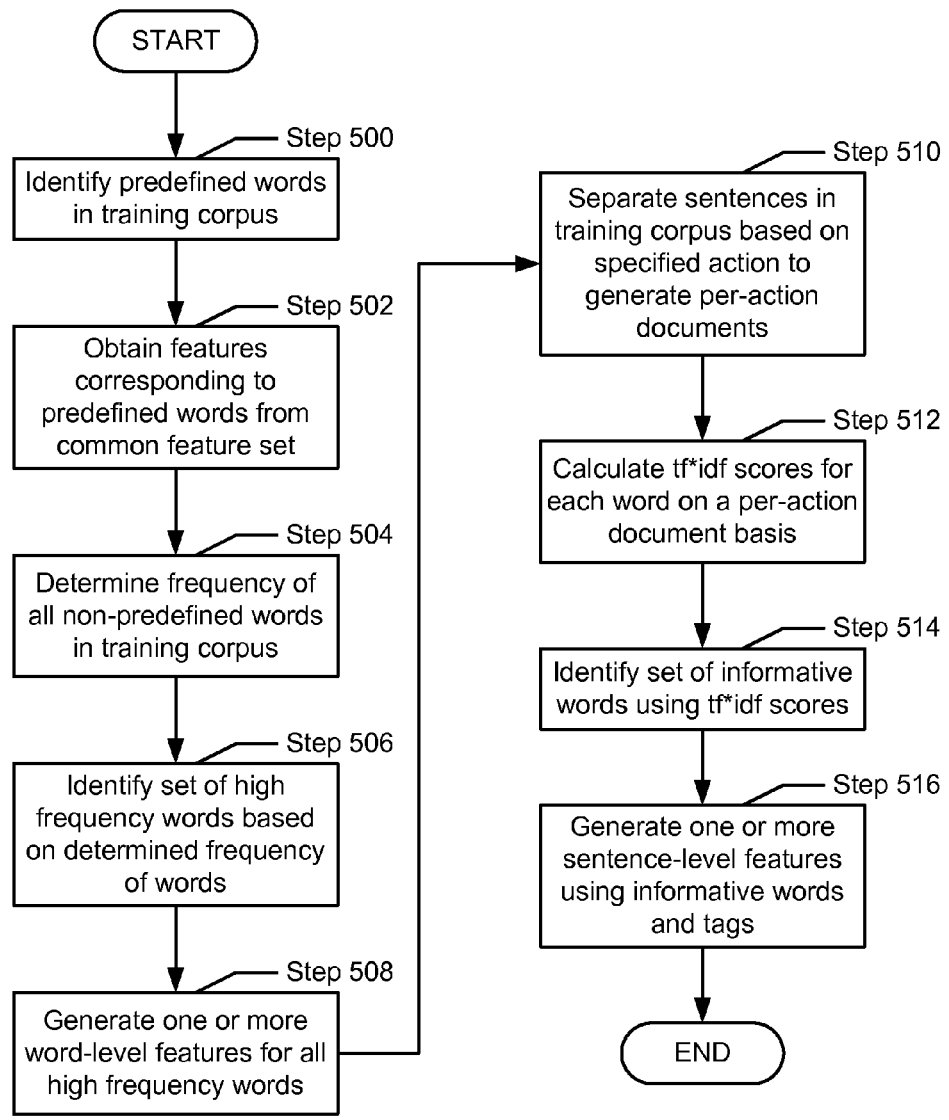
FIG. 5 shows a flowchart for generating features for a NLP model in accordance with one or more embodiments of the invention.

In one embodiment of the invention, an API management component (204) is configured to generate APIKeys for applications, where each APIKey has a unique ID that is associated with a unique NLP model generated by the NLP training engine (see FIGS. 4-6). Applications may use the APIKey as part of the API call to the NLP system (See FIG. 8). Further, the API management component is configured to track API usage an on per-APIKey basis and provide this information along with other related information (see e.g., FIG. 9F) to developers of the third party application).

In one embodiment of the invention, a NLP training engine (208) is configured to generate NLP models in accordance with FIGS. 4-7. In one embodiment of the invention, a NLP engine (206) is configured to use the NLP models to analyze the text received from the user devices and determine an action to provide to the user device. (See FIG. 8). In the event that the request packets include digital audio data instead of text, the NLP engine (or the NLP system) may include a speech-to-text engine configured to generate a transcript (in the form of text) from the digital audio data. The text is then subsequently processed by the NLP engine as described above. In another embodiment of the invention, if the NLP front-end receives digital audio data, the NLP front-end (or another component in the NLP system) provides the digital audio data to a third-party speech-to-text engine (not shown), which converts the digital audio data to text and then provides the text to the NLP engine (via the NLP front-end). The NLP engine is configured to process the various NLP models generated by the NLP training engine.

In one embodiment of the invention, a custom feature set(s) (210) corresponds to feature sets generated in accordance with FIGS. 5 and 6A. Each custom feature set is associated with a particular NLP model. In one embodiment of the invention, a feature is an indicator function (i.e., takes on a value of 0 or 1) of some property of an observation and the tag (defined below—see FIG. 4) that may be assigned. An example of two features is as follows:

$$h_1(y_c, x, [i-1, i]) = \begin{cases} 1 & \text{if Previous\_World}(x_i) = \text{"transcription"} \& y_i = I - \text{protein} \\ 0 & \text{otherwise} \end{cases}$$

$$h_2(y_c, x, [i-1, i]) = \begin{cases} 1 & \text{if Current\_Word}(x_i) = \text{"factor"} \& y_i = I - \text{protein} \\ 0 & \text{otherwise} \end{cases}$$

In the example, feature ($h_1$) specifies an observation (i.e., if Previous_Word($x_i$)=transcription) and a tag (i.e., "I-protein") Similarly, ($h_2$) specifies an observation (i.e., if Current_Word ($x_i$)=factor) and a tag (i.e., "I-protein"). Once the NLP model is trained each <feature, tag> pair is associated with one and only one weight, which can range from −infinity to +infinity, including zero, where the weight is used in combination with other weights to (i) determine the appropriate tag for a word in the text or (ii) determine the appropriate action (which is a type of tag) to associate with a set of words in the text or with the entire text.

In one embodiment of the invention, a regularization or feature selection regime removes features from the NLP model by exclusion of the feature or setting the weight to zero. Regularization applies constraints to each weight according to a function of the current magnitude of the weight, coercing unimportant weights insufficiently supported by the evidence in the training corpus towards zero weight. Feature selection chooses a subset of most important features by a figure of merit, including the informativeness of the feature as indicated by the training corpus. The resulting NLP model is reduced in feature complexity by an order of magnitude and represents a subset of the original features that particularly fits the training domain. Accordingly, while the a large set of features may be generated when performing FIGS. 5 and/or 6A, the number features that are ultimately used in the NLP model (i.e., are not associated with a zero or near-zero weight) may be significantly smaller than the original set of generated features. In one embodiment of the invention, the regularization or feature selection regime may be performed as during the training of the NLP model (see FIG. 4).

Continuing with the discussion of FIG. 2., in one embodiment of the invention, a common feature set(s) (212) corresponds to features that are defined as part of a common NLP model (also referred to as a generic NLP model). The common NLP model is a NLP model that is created and trained independently of the NLP models (also referred to as custom NLP models) generated in response to requests for third parties (see FIGS. 4-7). The common NLP model may be used to augment the features in the custom NLP models (see FIGS. 5 and 6A) and/or to analyze text (see FIG. 8).

The invention is not limited to the NLP system configuration shown in FIG. 2. In one embodiment of the invention, the NLP system may be implemented on virtually any type of computer system regardless of the platform being used. For example, the NLP system may be implemented on a computer system that includes one or more processor(s), associated memory (e.g., random access memory (RAM), cache memory, flash memory, etc.), a storage device (e.g., a hard disk, an optical drive such as a compact disk drive or digital video disk (DVD) drive, a flash memory stick, etc.), and numerous other elements and functionalities typical of today's computers (not shown). The computer may also include input means, such as a keyboard, a mouse, or a microphone (not shown). Further, the computer may include output means, such as a monitor (e.g., a liquid crystal display (LCD), a plasma display, or cathode ray tube (CRT) monitor). The computer system may be connected to the communication infrastructure (see e.g., FIG. 1, 102) via a network interface connection. Those skilled in the art will appreciate that many different types of computer systems exist, and the aforementioned input and output means may take other forms. Generally speaking, the computer system includes at least the minimal processing, input, and/or output means necessary to practice embodiments of the invention.

Further, those skilled in the art will appreciate that one or more elements of the NLP system may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources.

Figure 3:
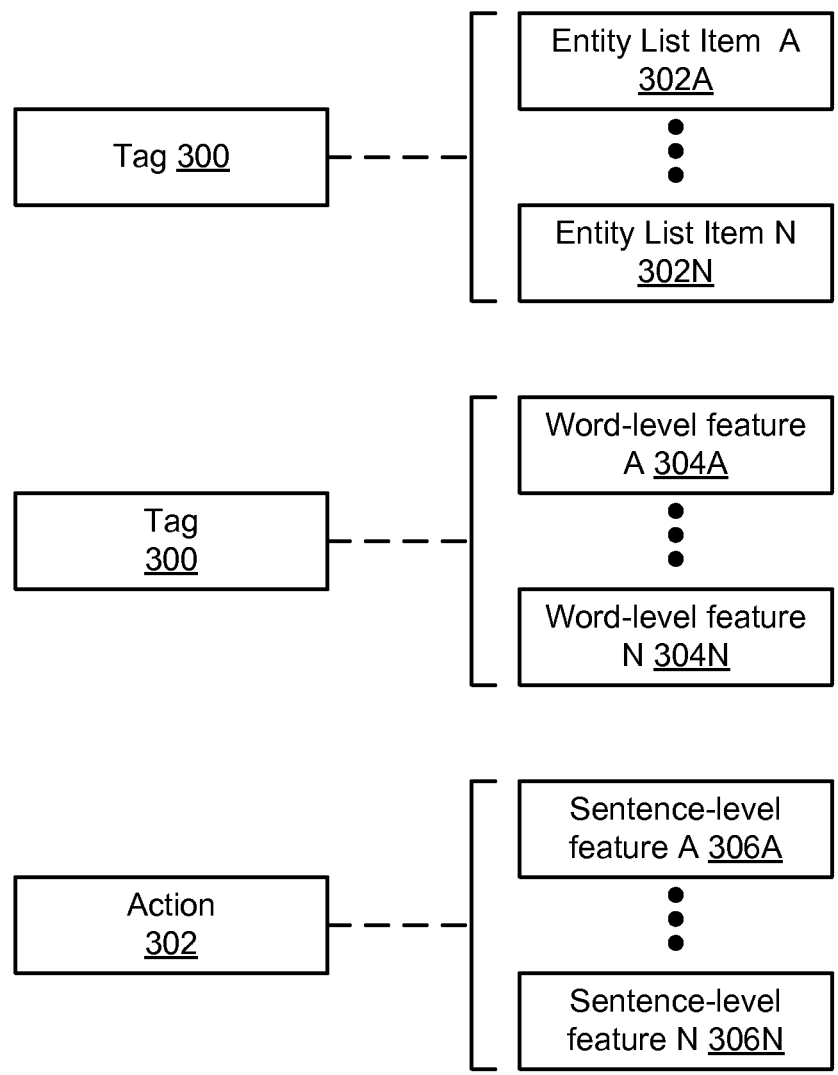
FIG. 3 shows relationships between various elements in accordance with one or more embodiments of the invention.

FIG. 3 shows relationships between various elements in accordance with one or more embodiments of the invention.

In one embodiment of the invention, the custom NLP models generated for third parties as well as the common NLP model(s) each include one or more tags. The NLP engine is configured to use an NLP model to associate a tag with one or more words, phrases, numbers, characters, symbols, etc. (collectively referred to as entities) in the text. A tag (also referred to as a semantic tag) is used to classify an entity (or group of entities) within a domain. Said another way, the semantic tag associated with an entity provides information for what the entity means in relation to the domain. For example, if the domain is hotel search then the semantic tags may be HOT, LOC-CITY, LOC-PREP, and NOI, where an entity tagged with HOT indicates that the entity is a hotel name, where an entity tagged with LOC-CITY indicates that the entity is city, where an entity tagged with LOC-PREP indicates that the entity is a spatial preposition, and where an entity tagged with NOI indicates that the entity is noise. The semantic tags are contrasted with part of speech tagging, in which the tags each identify a particular part of speech, e.g., noun, verb, etc.

In one embodiment of the invention, each tag (300) is associated with one or more entity list items (302A 302N). The entity list items are used to generate one or more features for the tag with which they are associated. The generated features may include, but are not limited to, (i) one feature per entity list item; (ii) one feature using all entity list items; (iii) a set of features each generated using two or more entity list items; or (iv) any combination thereof.

The entity list items for a given tag are collectively referred to as an entity list. Further, there may be one or mores entity list for each tag. Further, a single tag may be associated with multiple entity lists without departing from the invention. The entity list items may be stored in any type of data structure without departing from the invention.

In one embodiment of the invention, each tag (300) is also associated with one or more word-level features (304A, 304N). The word-level features are used by the NLP model to determine how to tag a particular word.

In one embodiment of the invention, each action (302) is associated with one or more sentence-level features (306A, 306N). The actions are provided when generating the NLP mode (see FIG. 4) and collectively correspond to the complete set of responses that may be provided to the third party application in response to the third party application providing text (see FIG. 8). Said another way, the only valid responses to an API call correspond to the actions. The sentence-level features correspond to indicator functions that are used to associate an action with an entire sentence (or phrase). However, to address situations in which the text provided in the API call only includes a single word, the sentence-level features may also be used to associate an action to a single word.

FIGS. 4-8 show flowcharts in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel. In one embodiment of the invention, the steps shown in any of the flowcharts may be performed in parallel with the steps shown in any of the other flowcharts.

Turning to FIG. 4, FIG. 4 shows a flowchart for generating an NLP model in accordance with one or more embodiments of the invention. In Step 400, a tag is obtained. As discussed above, the tag is part of the NLP model and will be used to tag entities in the text (see e.g., FIG. 8). In Step 402, one or more entity list items (described in FIG. 3) for the tag is obtained. For example, if the tag is Eczema, then the entity list items may include, pigmentation, scaling, red skin, itching, blisters, and oozing.

In Step 404, a determination is made about whether additional tags are required for the NLP model. If additional tags are required, then the process proceeds to step 400; otherwise the process proceeds to step 406.

In Step 406, one or more actions are obtained. As discussed above, actions correspond to sentence-level tags provided by the developer (or other user). The actions form the set of results that a third party application expects to receive when an API call is issued to the NLP system using the appropriate APIKey (see e.g., FIG. 8 and FIGS. 9A-9F).

In Step 408, the training corpus is obtained. The training corpus includes one or more sentences, clauses, or phrases that are to be used to (i) generate one or more features (see FIGS. 5 and 6A) and (ii) generate weights for various <tag, feature> pairs in the NLP model during step 412. Each sentence, clause, or phrase includes: (i) at least one word that is tagged with a tag obtained in step 400, (ii) zero or more words specified in the entity list associated with one of tags provided in step 400, and (iii) is associated with an action. In Step 410, features for the NLP model are generated using the tags, actions, and the training corpus (see FIGS. 5, 6A).

In Step 412, the NLP model, which includes the features and the tags, is trained using the training corpus. The NLP model may be trained using any known method for training NLP models without departing from the invention. The NLP model may be a maximum entropy model, a maximum entropy Markov model, a model based on a conditional random field, a model based on a support vector machine, a model based on a neural network, or any other type of NLP model without departing from the invention. At the completion of step 412, the NLP model includes, tags, features, and weights associated with one or more <tag, feature> pairs, where the weights for the <tag, feature> pairs are generated during the training of the NLP model.

In Step 414, the NLP model trained in Step 412 may be combined with an existing NLP model. The model conjunction related to Step 414 is described in further detail in FIG. 6B. In Step 416, the NLP model is validated using a test console and/or a test suite. Additional detail about the validation of the NLP model is described below in FIG. 7 and FIGS. 9D and 9E.

In Step 418, an APIKey is generated for the NLP model. The APIKey uniquely identifies the NLP model and may be used by third party applications to access the NLP model. Specifically, the APIKey allows third party applications to issue API calls to the NLP system and receive, in response to the API call, an action (of the set of actions specified in Step 406). The application may then use the action to trigger the execution of a method(s) in the application.

While FIG. 4 refers to a generating a single NLP model, embodiments of the invention may be implemented in which FIG. 4 generates at least two NLP models—one for word-level tagging and one for sentence-level tagging.

FIG. 5 shows a flowchart for generating features for an NLP model in accordance with one or more embodiments of the invention. More specifically, FIG. 5 provides a method for automatically generating word-level features and sentence-level features for the NLP model using tags, actions, and the training corpus.

In Step 500, the training corpus is analyzed to identify one or more predefined words. Examples of predefined words include, but are not limited to, "to"; "of"; "in"; "for"; "on"; "with"; "at"; "by"; "from"; "up"; "about"; "into"; "over"; "after"; "beneath"; "under"; "above". In Step 502, features corresponding to the predefined words are obtained from the common feature set (FIG. 2, 212) and added to the NLP model.

In Step 504, the frequency of all non-predefined words in the training corpus is calculated. In Step 506, a set of high-frequency words in the training corpus is identified using the frequencies calculated in Step 504. A particular word may be deemed to be a high-frequency word if the word appears in the training corpus at a frequency higher than a predefined frequency. Alternatively, a particular word may be deemed to be a high-frequency word if its frequency is in the top N number of words (ordered by frequency) in the training corpus. The value of N may be set by the NLP system or provided by the user of the NLP system. In Step 508, one or more word-level features are generated using the high frequency words. Examples of word-level features include, but are not limited to, bigram features (i.e., features that provide the conditional probability of a tag for a word given the tag applied to the preceding word) and word features (i.e., features that provide the conditional probability of a tag for a word given the two previous words, the current word, the two words following the current word). The above examples are not meant to be an exhaustive list of word-level features. Further, the above examples are not intended to limit the scope of the invention.

Continuing with FIG. 5, in Step 510, the sentences in the training corpus are separated into per-action documents based on the action with which they are associated. For example, all sentences in the training corpus associated with Action 1 are separated into a first document and all sentences associated with Action 2 are separated into a second training document. The manner in which the sentences are separated and subsequently stored may vary based on the implementation. Further, in certain embodiments of the invention, step 510 may be combined with Step 512.

In Step 512, a tf*idf score is calculated for each word on a per-action document basis. As implemented in one embodiment of the invention, tf*idf (term frequency-inverse document frequency), is a numerical statistic which reflects how important a word is to a sentence within the per-action document. The tf*idf value increases proportionally to the number of times a word appears in the sentence, but is offset by the frequency of the word in the per-action document, which helps to control for the fact that some words are generally more common than others. In this manner, words that are important for each of the actions (provided in Step 406) are identified. Other methods may be used to identify informative words without departing from the invention. Examples of such methods include, but are not limited to, a chi-square test (i.e., a statistical test using the chi-square distribution to test the independence of two events (A, B)) and a binomial logarithmic likelihood ratio test (i.e., a measurement of the likelihood of two events (A, B) occurring together (A & B)) based on the ratios of logarithmic binomials over each event separately and the logarithmic binomial of the events occurring together. Other tests may be used without departing from the invention.

The aforementioned method may also be used (instead of or in addition) to identify other informative features from the training corpus in order to generate word-level features. For example, the aforementioned methods may be able to identify collocation features, tag trigrams, or any other combined features where the combined features are more informative than the individual features.

Continuing with FIG. 5, in Step 514, the set of informative words based on the tPidf scores is identified. A particular word may be deemed to be an informative word if its tPidf score is higher than a predefined tf*idf score. Alternatively, a particular word may be deemed to be an informative word if its tPidf score is in the top N number of words (order by tPidf score) in the per-action document. The value of N may be set by the NLP system or provided by the user of the NLP system.

In Step 516, one or more sentence-level features are generated using the informative words and the tags (obtained in Step 400). The sentence-level feature may include features that (i) are based solely on the informative words, (ii) are based solely on the tags, or (iii) are based on a combination of one or more informative words and one or more tags. With respect to items (ii) and (iii), these sentence-level features rely on the NLP engine tagging the received text using the word-level features and then tagging the sentence with an action based on the tags associated with the words in the text.

FIGS. 6A-6B show flowcharts for generating features for an NLP model using model conjunction in accordance with one or more embodiments of the invention. More specifically, embodiments of the invention enable the custom NLP models (i.e., the NLP models generated using FIG. 4) to be augmented using a generic NLP model that has been previously generated and trained. Unlike the custom NLP models, the generic model only includes word-level features. However, these word-level features may be generated by subject matter experts. For example, the generic NLP model may include features associated with the tag "Location," where the features are optimized to identify a particular word in text as being associated with a location.

FIGS. 6A and 6B describe embodiments for using generic NLP models in combination with the custom NLP model. Referring to FIG. 6A, in Step 600, the generic NLP model is applied to the training corpus. The result is a training corpus in which various words are tagged with common tags (i.e., tags in the generic NLP model).

In Step 602, a word in the training corpus is selected. In Step 604, a determination is made about whether the selected word is associated with both a common tag (based on the application of the generic NLP model to the training corpus in step 600) and a tag (i.e., a tag obtained in Step 400). As described above, the training corpus includes one or more words tagged with a tag (of the set of tags) obtained in Step 400, if the word is tagged with both a common tag and a tag, then the process proceeds to step 606; otherwise the process proceeds to Step 608.

In Step 606, a word-level feature for the tag is generated using the common tag. The word-level feature is then added to the NLP model. In Step 608, a determination is made about whether there are additional words to process. If there are additional words to process, the process proceeds to Step 602; otherwise, the process ends.

The following is a brief example of the method shown in FIG. 6A. The example is not intended to limit the scope of the invention. Turning to the example, consider a scenario in which: (i) the generic NLP model includes the tag LOCATION; (ii) the customer NLP model includes the tags SOURCE and DESTINATION; and (iii) the training corpus includes the training sentence: "I want to go from Rocklin [SOURCE] to Santa Clara[DESTINATION]." When the generic NLP model is applied to the training sentence it tags Rocklin and Santa Clara with LOCATION. Based on this, two features are generated for the custom NLP model: (i) a feature for the SOURCE tag that uses the LOCATION tag and (ii) a feature for the DESTINATION tag that uses the LOCATION tag.

Referring to FIG. 6B, FIG. 6B relates to a method for NLP model conjunction in which the trained NLP model is modified (after training) to replace previously provided tags with common tags and to include additional features (associated with additional weights based on prior training).

In Step 610, a tag from the set of tags obtained in Step 400 is selected. In Step 612, a determination is made about whether the tag equals a predefined tag. This determination may be made manually by a user or, alternatively, may be made by the NLP system. A tag equals a predefined tag when (i) the tag is identical to the predefined tag or (ii) the tag has the same semantic means as the predefined tag, e.g., DESTINATION tag equals CITY tag. If the tag equals a pre-defined tag, the process proceeds to Step 614; otherwise the process proceeds to Step 618.

In Step 614, the common feature(s) corresponding to the predefined tag is obtained from the common feature set. In Step 616, the NLP model is updated. Specifically, (i) the tag in the model is replaced with the predefined tag; (ii) a common feature(s) corresponding to the predefined tag is added to the NLP model; (iii) prior training information for the common feature(s) is added to the NLP model. In addition, though not shown in FIG. 6B, all other features that use the tag are updated to use the predefined tag.

In Step 618, a determination is made about whether there are additional tags to process. If there are additional tags to process, the process proceeds to step 610; otherwise, the process ends.

The following is a brief example of the method shown in FIG. 6B. The example is not intended to limit the scope of the invention. Turning to the example, consider a scenario in which: (i) there is a generic NLP model that includes tags: CITY, STATE; (ii) there is a custom NLP model that includes tags: DESTINATION, GUITAR; and (iii) DESTINATION equals CITY. Prior to performing the steps in FIG. 6B, the aforementioned NLP models are as follows:

| Generic NLP Model | | |
| --- | --- | --- |
| | Feature 1 | Feature 2 |
| CITY | 0.993 | −0.236 |
| STATE | 1.89 | −0.365 |

| Custom NLP Model | | |
| --- | --- | --- |
| | Feature 3 | Feature 4 |
| DESTINATION | 10.937 | −0.8936 |
| GUITAR | 9.2 | −0.345 |

After performing the steps in FIG. 6B, the custom NLP model is as follows:

| | Feature 1 | Feature 2 | Feature 3 | Feature 4 |
| --- | --- | --- | --- | --- |
| CITY | 0.993 | −0.236 | 10.937 | −0.8936 |
| GUITAR | 9.2 | −0.345 | 0 | 0 |

FIG. 7 shows a flowchart for validating the NLP model in accordance with one or more embodiments of the invention. In Step 700, a sample sentence (or phrase) is obtained. In Step 702, the sample sentence is processed or otherwise analyzed by the NLP engine using the NLP model created in FIG. 4 to (i) associate one or more words with a tag from the set of tags in the NLP model, and (ii) associate the sample sentence with an action.

In Step 704, the results generated in step 702 are provided to the user in order to allow the user to validate that the NLP engine (i) properly tagged one or more words in the sentence (or phrase) and/or (ii) that the NLP engine tagged the sentence (or phrase) with the appropriate action. (see e.g., FIG. 9C).

In Step 706, the user may provide input as to whether the results are correct (or otherwise valid). For example, the user may indicate (i) which words were correct or incorrectly tagged and/or (ii) whether the sentence (or phrase) was properly or improperly tagged with an action.

In Step 708, the NLP engine, based on the validation input provided by the user in step 706, may calculate an action score (i.e., the percentage of correct actions identified by the NLP model), an entity score (i.e., the percentage of correctly tagged entities by the NLP model), and a confidence score (i.e., a weighted value based on the action score and the entity score that provides a level of confidence of the NLP model as a whole).

In Step 710, a determination is made about whether there are additional sentences to process. If there are additional sentences (or phrases) to process, the process proceeds to Step 700; otherwise, the process ends. The NLP engine may be given a batch of sample sentences (or phrases) to process instead of being provided with a single sample sentence (or phrase) to process without departing from the invention.

FIG. 8 shows a flowchart for using an API for an NLP model in accordance with one or more embodiments of the invention.

In Step 800, an API call with text, a timestamp (i.e., time when API call was issued), an APIKey, and a signature (e.g., an HMAC of the text using a secret key) is received by the NLP system. The API call may be issued by a client. The API call may include other/additional information without departing from the invention.

In Step 802, the APIKey is validated. If the APIKey is invalid, then the process ends; otherwise, the process proceeds to Step 804. In Step 804, the APIKey is used to determine which NLP model in the NLP engine is used to process the text.

Step 806A is performed when the NLP model does not include any features generated using FIG. 6A. Step 806B is performed when the NLP model includes at least one feature generated using FIG. 6A.

In Step 806A, the NLP engine, using the NLP model, processes the text. The processing in Step 806A includes (i) performing word-level tagging on the text to obtain tags for text, and (ii) performing sentence level tagging using the text as well as tags in the text to obtain an action.

In Step 806B, the NLP engine, using the NLP model and the generic NLP model, processes the text. The processing in Step 806B includes (i) performing, using the generic NLP model, word-level tagging on the text to obtain common tags for text, (ii) performing, using the NLP model and the common tags, word-level tagging on the text to obtain tags for text, and (iii) performing sentence level tagging using the text as well as tags in the text to obtain an action. In Step 808, the action is subsequently provided to the application that sent the API call.

FIGS. 9A-9F show an example in accordance with one or more embodiments of the invention. This example is not intended to limit the scope of the invention or the claims.

Consider a scenario in which the a third party is creating a "Doctor On Call" application that includes tags: Asthma, HeartDisease, Diabetes, and Eczema, and actions: diagnose and prescribe. The developer may create entity lists for each of these tags and upload (or otherwise provide) entity list items via the user interface shown in FIGS. 9A and 9B, which may be provided by the NLP front-end (see FIG. 2).

Figure 9A:
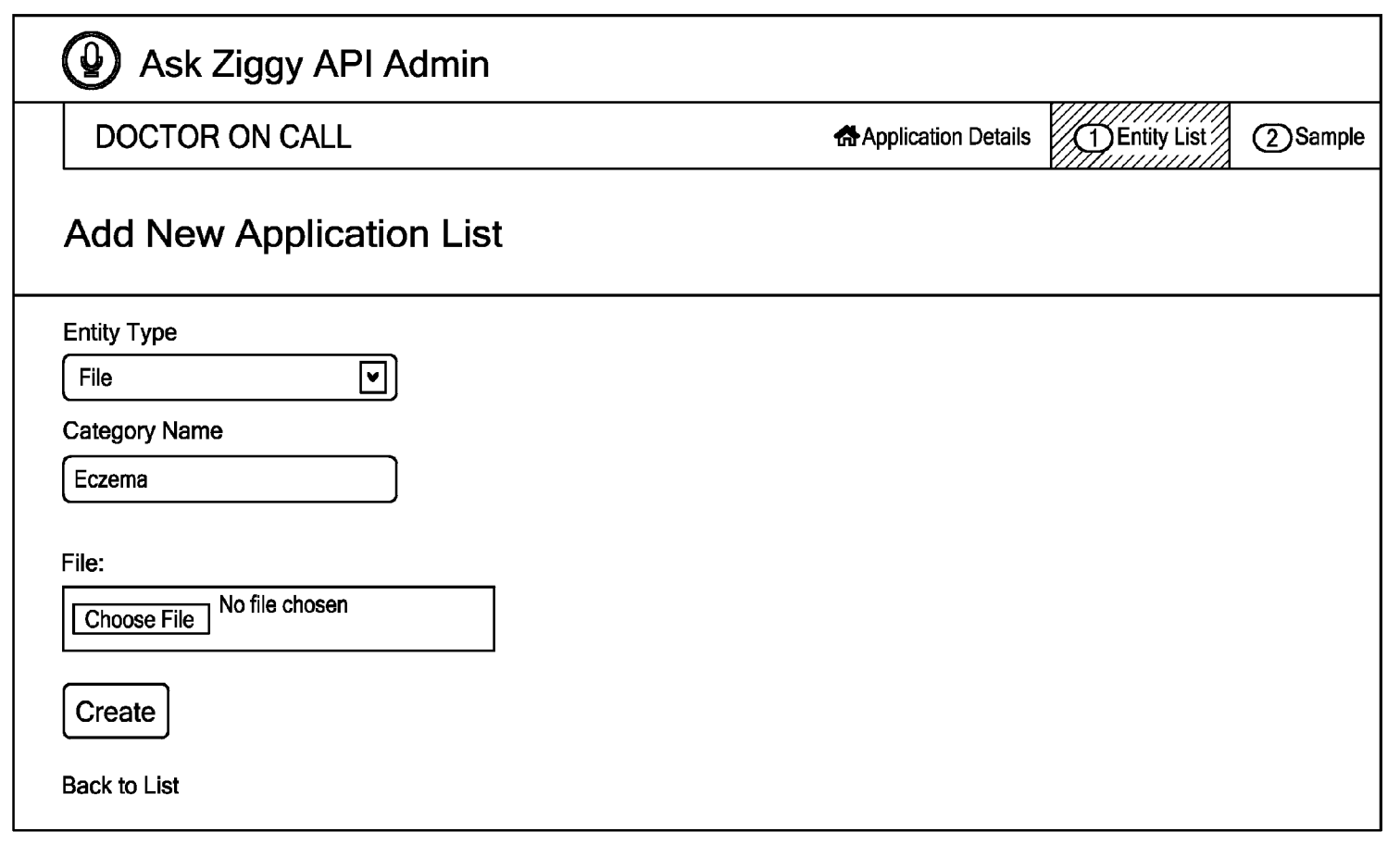
Figure 9C:
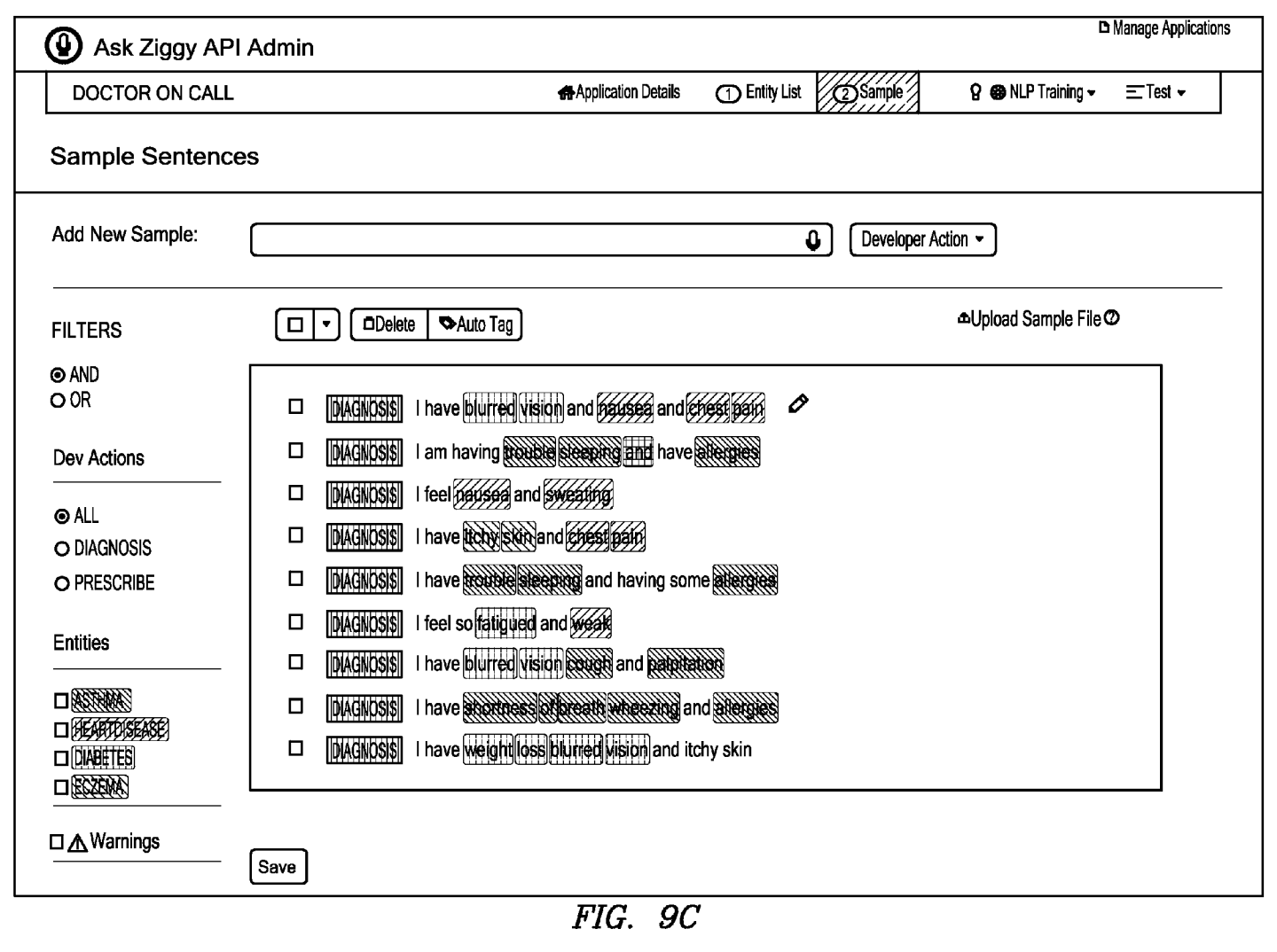

Referring to FIG. 9C, the developer may upload sample sentences (collectively referred to as a training corpus) which are tagged using the above tags and actions. In accordance with FIGS. 4, 5, and 6A, the NLP training engine (not shown) may generate the word-level features and sentence-level features, and then train the NLP model using the action, tags, features, and sample sentences.

Referring to FIG. 9D, the developer may debug/test the NLP model using the test console. The test console provides developers with the ability to review both the text portion of the test API call and the corresponding output—namely what words were tagged with which tags and the action with which the input was tagged.

Figure 9E:
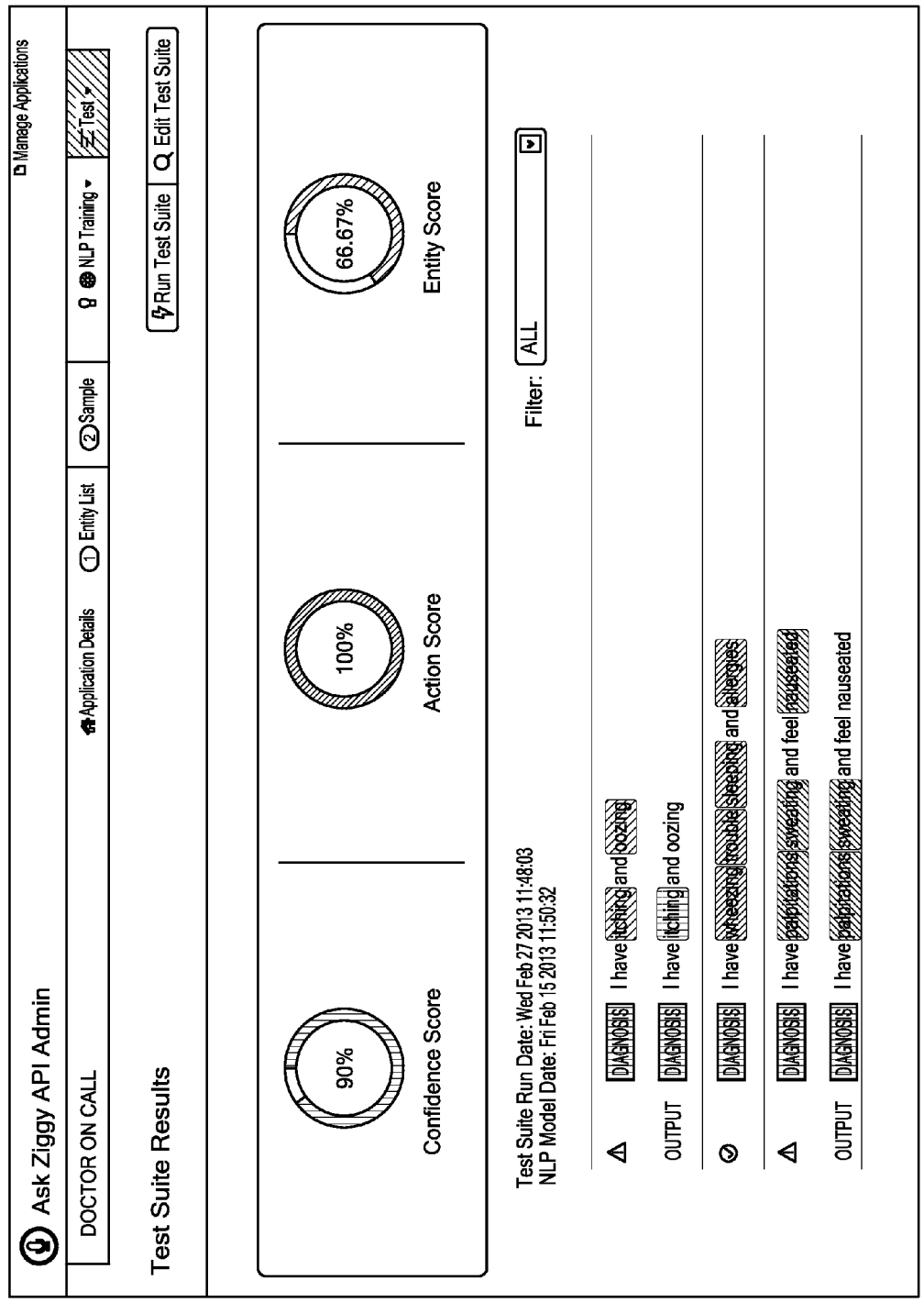

Referring to FIG. 9E, the developer may upload a batch of sample sentences and then validate the results of the word-level and sentence-level tagging via the test console. The test console may also provide an indication of various metrics related to the NLP model and the current sample sentences being used to test the NLP model.

Figure 9F:
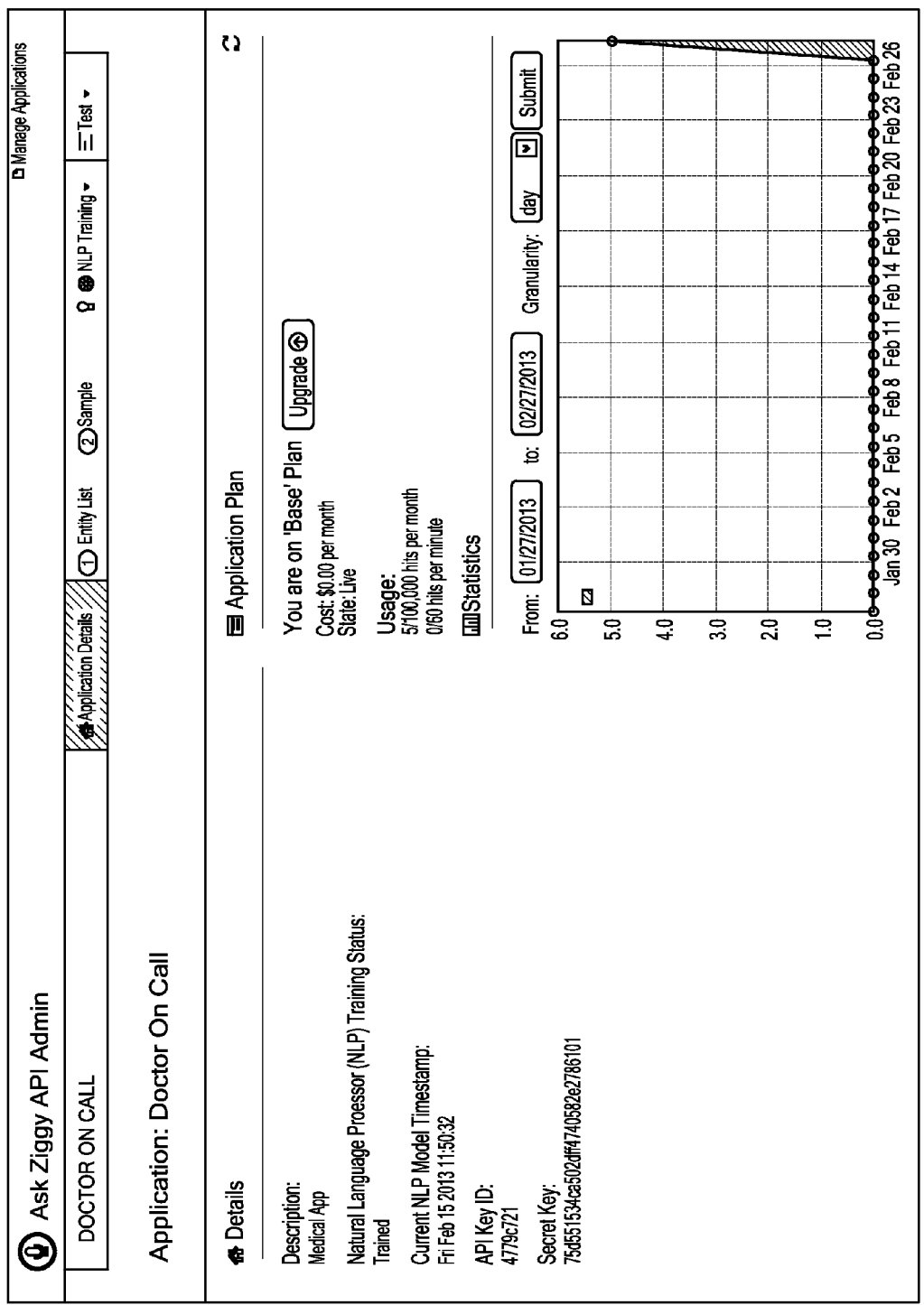

Referring to FIG. 9F, once the NLP model is ready to be deployed, the NLP system may provide the developer with an APIKey that may be used to access the NLP model. The developer may also be able to access the NLP model/NLP system, via a user interface provided by the NLP front-end (with content from the API management component). Examples of the type of data collected by the API management console is shown in FIG. 9F.

Software instructions to perform embodiments of the invention may be stored on a non-transitory computer readable medium such as a magnetic storage, optical storage, solid state storage, or any other computer readable storage device. Further, such instructions may be executed by a processor(s) as described above.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising instructions, which when executed perform a method for generating a natural language processing (NLP) model, the method comprising:
   obtaining a plurality of tags;
   obtaining a plurality of actions to be implemented by a third party application;
   obtaining a training corpus comprising a plurality of sentences, wherein at least one word in each of the plurality of sentences is associated with one of the plurality of tags, and wherein each of the plurality of sentences is associated with one of the plurality of actions;
   generating a plurality of features for the NLP model for the third party application using the plurality of tags, the plurality of actions, and the training corpus;
   training the NLP model using the plurality of features and the training corpus to obtain a trained NLP model, wherein after training the NLP model at least one tag of the plurality of tags in the trained NLP model is replaced with a predefined tag from a common NLP model and prior training information for common features from the common NLP model associated with the predefined tag is added to the trained NLP model; and
   generating an APIKey for use by the third party application, wherein the API provides the third party application access to the trained NLP model.

2. The non-transitory computer readable medium of claim 1, the method further comprising:
   prior to generating the APIKey:
   validating the trained NLP model using a sample sentence, wherein an NLP engine using the trained NLP model tags at least one entity in the sample sentence with one of the plurality of tags and tags the sample sentence with one of the plurality of actions.

3. The non-transitory computer readable medium of claim 2, wherein the trained NLP model is validated when a user confirms that the NLP engine, using the trained NLP model, correctly tagged the sample sentence.

4. The non-transitory computer readable medium of claim 1, wherein the trained NLP model is a maximum entropy Markov model.

5. The non-transitory computer readable medium of claim 1, wherein a tag of the plurality of tags is associated with an entity list comprising entity list items, wherein at least one of the entity list items is used to generate one of the plurality of features for the tag.

6. The non-transitory computer readable medium of claim 1, wherein one of the plurality of features is a word-level feature.

7. The non-transitory computer readable medium of claim 6, wherein the word-level feature is one selected from a group consisting of a feature from a common feature set and a feature for a high frequency word in the training corpus.

8. The non-transitory computer readable medium of claim 1, wherein one of the plurality of features is a sentence-level feature.

9. The non-transitory computer readable medium of claim 8, wherein the sentence-level feature is generated using an informative word and one of the plurality of tags.

10. The non-transitory computer readable medium of claim 9, wherein the informative word is identified from the training corpus using term frequency-inverse document frequency (tf*idf) scores.

11. The non-transitory computer readable medium of claim 9, wherein the informative word is identified by combining all sentences in the training corpus that are associated with one of the plurality of actions to generate a per-action document, calculating tf*idf scores for each of the words in the per-action document, and identifying the informative word using the tf*idf scores.

12. The non-transitory computer readable medium of claim 8, wherein the sentence-level feature specifies one of the plurality of tags.

13. The non-transitory computer readable medium of claim 8, wherein the sentence-level feature does not specify any of the plurality of tags.

14. The non-transitory computer readable medium of claim 1, wherein the action is associated with a method in the third party application.

15. The non-transitory computer readable medium of claim 1, wherein the APIKey is uniquely associated with the third party application.

16. The non-transitory computer readable medium of claim 15, the method further comprising:
   receiving an API call from the third party application, wherein the API call comprises text and the APIKey, wherein the text corresponds to an utterance of a user of the third party application.

17. The non-transitory computer readable medium of claim 16, the method further comprising:
   identifying the trained NLP model using the APIKey; and
   analyzing the text using the trained NLP model to generate a result, wherein the result specifies one of the plurality of actions.

18. The non-transitory computer readable medium of claim 17, wherein analyzing the text comprises:
   associating each of a plurality of entities in the text with one selected from a group consisting of one of the plurality of tags and a noise tag to obtain a set of tags for the text; and
   identifying the action using the set of tags for the text and the sentence-level features.

19. The non-transitory computer readable medium of claim 16, wherein the utterance is an audio utterance.

20. The non-transitory computer readable medium of claim 1, wherein at least one of the plurality of features may be generated using the common NLP model, wherein the common NLP model is trained.

21. The non-transitory computer readable medium of claim 20, wherein generating the one of the plurality of features using the common NLP model comprises tagging the training corpus with predefined tags specified in the common NLP model to obtain a set of predefined tags, and generating the one of the plurality of features for one of the plurality of tags using at least one of the set of predefined tags.

* * * * *